United States Patent
Mody

(10) Patent No.: US 10,469,421 B2
(45) Date of Patent: Nov. 5, 2019

(54) CONTENT-ITEM LINKING SYSTEM FOR MESSAGING SERVICES

(71) Applicant: Dropbox, Inc., San Francisco, CA (US)

(72) Inventor: Viraj Mody, Kirkland, WA (US)

(73) Assignee: Dropbox, Inc., San Francisco, CA (US)

( * ) Notice: Subject to any disclaimer, the term of this patent is extended or adjusted under 35 U.S.C. 154(b) by 178 days.

(21) Appl. No.: 15/065,714

(22) Filed: Mar. 9, 2016

(65) Prior Publication Data

US 2016/0191435 A1    Jun. 30, 2016

Related U.S. Application Data

(63) Continuation of application No. 13/851,044, filed on Mar. 26, 2013, now Pat. No. 9,300,611.

(51) Int. Cl.
*G06F 15/16* (2006.01)
*H04L 12/58* (2006.01)
*G06F 15/173* (2006.01)

(52) U.S. Cl.
CPC .............. *H04L 51/10* (2013.01); *H04L 51/08* (2013.01)

(58) Field of Classification Search
CPC ............................... H04L 51/10; H04L 51/68
USPC .................................................. 709/217, 224
See application file for complete search history.

(56) References Cited

U.S. PATENT DOCUMENTS

| | | | |
|---|---|---|---|
| 5,781,901 A | 7/1998 | Kuzma | |
| 8,606,656 B1 | 12/2013 | Franklin et al. | |
| 8,725,770 B2 | 5/2014 | Koide et al. | |
| 8,775,565 B2 * | 7/2014 | Greco | G06Q 10/10 709/204 |
| 2001/0052019 A1 | 12/2001 | Walters et al. | |
| 2002/0033844 A1 | 3/2002 | Levy et al. | |
| 2003/0097361 A1 | 5/2003 | Huang et al. | |
| 2003/0200268 A1 | 10/2003 | Morris | |
| 2004/0006706 A1 * | 1/2004 | Erlingsson | G06F 21/51 726/30 |
| 2004/0215696 A1 | 10/2004 | Fisher et al. | |
| 2004/0230657 A1 | 11/2004 | Tomkow | |
| 2005/0097114 A1 | 5/2005 | Carro | |

(Continued)

OTHER PUBLICATIONS

"LinkAttach", LinkAttach; Source: LinkAttach.com; Copyright LinkAttach (Mar. 18, 2013); Located Via Google Search; printed Mar. 18, 2013; 4 pages.

*Primary Examiner* — Karen C Tang
(74) *Attorney, Agent, or Firm* — Polsinelli PC

(57) ABSTRACT

A client service, such as a plug-in to a browser, can alter a document retrieved from a compatible service to augment the document with services from an online content management service. When an application retrieves a compatible document, the client service can detect a document element within the document and alter the document to provide an activatable reference to the online content management service. For example, a client service can recognize an email composition webpage or an email display webpage and insert activatable references provide services from the online content management service. In email composition webpages, a reference can be a button that allows an email author to insert a link to a content item from the online content management service. In email display webpages, references can be added that allow attachments to be sent to the online content management service for storage.

18 Claims, 9 Drawing Sheets

(56) References Cited

U.S. PATENT DOCUMENTS

| | | |
|---|---|---|
| 2005/0187895 A1 | 8/2005 | Paya et al. |
| 2005/0228899 A1 | 10/2005 | Wendkos et al. |
| 2006/0075228 A1* | 4/2006 | Black .................. H04L 63/0428 713/167 |
| 2006/0101005 A1 | 5/2006 | Yang et al. |
| 2006/0265390 A1 | 11/2006 | Aldrich et al. |
| 2006/0265458 A1 | 11/2006 | Aldrich et al. |
| 2006/0294199 A1 | 12/2006 | Bertholf |
| 2007/0011258 A1 | 1/2007 | Khoo |
| 2007/0100928 A1* | 5/2007 | Sylthe ............... G06F 17/30905 709/200 |
| 2007/0208751 A1* | 9/2007 | Cowan .................. G06Q 10/10 |
| 2008/0122796 A1* | 5/2008 | Jobs ..................... G06F 3/0488 345/173 |
| 2008/0184138 A1 | 7/2008 | Krzanowski et al. |
| 2008/0281924 A1 | 11/2008 | Gadwale |
| 2009/0187852 A1* | 7/2009 | Tsuruta ................ G06Q 10/107 715/800 |
| 2010/0070593 A1* | 3/2010 | Sayers ................. G06Q 10/107 709/206 |
| 2010/0235746 A1* | 9/2010 | Anzures .............. G06F 3/04883 715/723 |
| 2011/0087957 A1* | 4/2011 | Dumitru .............. G06Q 10/107 715/234 |
| 2011/0153857 A1* | 6/2011 | Dumitru .............. G06Q 10/107 709/231 |
| 2012/0278404 A1 | 11/2012 | Meisels et al. |
| 2012/0317218 A1 | 12/2012 | Anderson et al. |
| 2013/0031208 A1* | 1/2013 | Linton .................... G09B 7/02 709/217 |
| 2013/0054713 A1* | 2/2013 | Jhon ...................... H04L 67/34 709/206 |
| 2014/0047413 A1 | 2/2014 | Sheive et al. |
| 2014/0281890 A1 | 9/2014 | D'Angelo et al. |
| 2015/0193108 A1* | 7/2015 | Li ......................... G06F 3/0486 715/748 |
| 2016/0299644 A1* | 10/2016 | Higuchi ................ G06F 3/0482 |

\* cited by examiner

```
<HTML>  804
<BODY>
<DIV class="Sender">
...
</DIV>
<DIV class="Receiver">
...
</DIV>
<DIV class="Attach">  806
...
<form action="attach_file.php">
...
<input type="submit" value="Attach File" />
</form>
...
</DIV>
</BODY>
</HTML>
```

*FIG. 8A*

```
<HTML>  804
<BODY>
<DIV class="Sender">
...
</DIV>
<DIV class="Receiver">
...
</DIV>
<DIV class="Attach">  806
...
<form action="attach_file.php">
...
<input type="submit" value="Attach File" />
</form>
<a href="#" onMouseUp="link()">
  <img src="http://ocms.com/link.jpg">
</a>
<script type="text/javascript">
function link()
{
...
}
</script>
...
</DIV>
</BODY>
</HTML>
```

*FIG. 8B*

CONTENT-ITEM LINKING SYSTEM FOR MESSAGING SERVICES

CROSS-REFERENCE TO RELATED APPLICATIONS

This application is a continuation of U.S. application Ser. No. 13/851,044, filed Mar. 26, 2013, entitled, "CONTENT-ITEM LINKING SYSTEM FOR MESSAGING SERVICES", which is incorporated by reference herein in its entirety.

BACKGROUND OF THE INVENTION

The present disclosure relates generally to online content management services and in particular to selectively providing links to content items stored in such services within an existing messaging client.

Online content management services allow users to access and manage content across multiple devices using the Internet. In a typical online content management service, a user establishes an account with the service provider and can associate various content items with the account. For example, some online content management services may allow the user to store content items (including but not limited to text documents; email messages; text messages; other types of messages; media files such as photos, videos, and audio files; and/or folders containing multiple files) and to selectively allow other users to access the content items. Content items can be stored in a master repository maintained by the service provider and mirrored to or synchronized with local copies on various user devices. Users may also be able to receive updates based on activity of other users; for instance, in a social network, status updates or other content items posted by one user can be propagated to other users who have indicated interest in receiving them.

With the proliferation of email, a user can receive and send documents from disparate sources but that arrive to the same inbox. Users can upload locally stored files to be an email attachment on outgoing emails. Users can also download email attachments to local storage. Keeping these attached files organized can present challenges for users.

BRIEF SUMMARY OF THE INVENTION

Certain embodiments of the present invention relate to altering a document retrieved from a compatible service to provide an activatable reference to an online content management service. When an application retrieves a compatible document, a client service can detect a document element within the compatible document and alter the document to provide extra services from an online content management service. For example, a client service can recognize an incoming document as an email composition webpage or an email display webpage and insert references that when activated provide services from the online content management service.

In email composition webpages, a reference can be a button that allows an email author to insert a link to a content item from the online content management service rather than upload a file as an email attachment. For example, a browser plug-in can enable an email author to insert a reference to a content item into a body of an email during composition of the email. The plug-in can detect when a compatible email service is accessed. When an email composition page is accessed, an attach document button can be detected within the page's source code. Near the attach document button, the plug-in can add a new button that accesses the online content management service. When the new button is activated, such as by being clicked by the email author, a content item selection window can be shown. The content item selection window can display content items available from the online content management service. The selection window can receive a selection of a content item by the email author and pass the selection to the plug-in. The plug-in can request a reference, such as a link, to the content item from the online content management service and insert the reference into a body of the email. By using the reference, actual attachment of a content item to an email can be avoided while the content item is still made available to the email recipient through the reference.

In email display webpages, references can be added that allow attachments to be sent to the online content management service for storage rather than downloaded to a user machine. For example, a browser plug-in can insert an activatable reference in an email display webpage such that activation of the reference allows an online content management service to store an email attachment of the displayed email. The plug-in can detect when a compatible email service is accessed and an email attachment is offered for download. An email display webpage can be scanned for the attachment download link and a new request element can be added. When activated, such as by being clicked by an email recipient, the request element can cause the online content management service to retrieve and store the email attachment.

A client service, such as a browser plug-in, can manage augmented services using the online content management service and an email service. For example, the browser plug-in can authenticate a user to the online content management service and receive user credentials. The browser plug-in can then use the credentials to retrieve lists of a user's content items available to link. The browser plug-in can also use application programming interfaces (API's) to the online content management service to provide the augmented services. For example, the browser plug-in can request that an attachment be stored in the online content management service upon direction from an email recipient. Other options can also be controlled, including providing restricted links, link analytics and/or single use links.

BRIEF DESCRIPTION OF THE DRAWINGS

FIG. 8A shows an example of an HTML, document according to an embodiment of the present invention.

FIG. 8B shows an example of an augmented HTML document after insertion of a online content management element according to an embodiment of the present invention.

DETAILED DESCRIPTION OF THE INVENTION

Certain embodiments of the present invention relate to altering a document retrieved from a compatible service (e.g., an email service or a social network service) to provide an activatable reference to an online content management service. When an application executing a client retrieves a compatible document (e.g., a web page), a client service can detect a document element within the compatible document and alter the document to provide extra services from an online content management service. For example, a client service can recognize an incoming document as an email composition webpage or an email display webpage and insert references that when activated provide services from the online content management service. In email composition webpages, for example, a reference can be a button that allows an email author to insert a link to a content item from the online content management service rather than upload a file as an email attachment. In email display webpages, references can be added that allow attachments to be sent to the online content management service for storage rather than downloaded to a user machine. A client service, such as a browser plug-in, can manage the augmented services using the online content management service and an email service.

For example, a browser plug-in can enable an email author to insert a reference to a content item into a body of an email during composition of the email. A browser can request an email composition page from a compatible email service. The plug-in can detect that the email composition page has been accessed. The plug-in can scan the email composition page to detect an attach document button. Near the attach document button, the plug-in can insert a new button that accesses the online content management service. When the new button is activated, such as clicked by the email author, a content item selection window can be shown. The content item selection window can display content items available from the online content management service. The selection window can receive a selection of a content item by the email author and pass the selection to the plug-in. The plug-in can request a reference, such as a link, to the content item from the online content management service and insert the reference into a body of the email. By using the reference, actual attachment of a content item to an email can be avoided while the content item is still made available to the email recipient through the reference.

Figure 1:
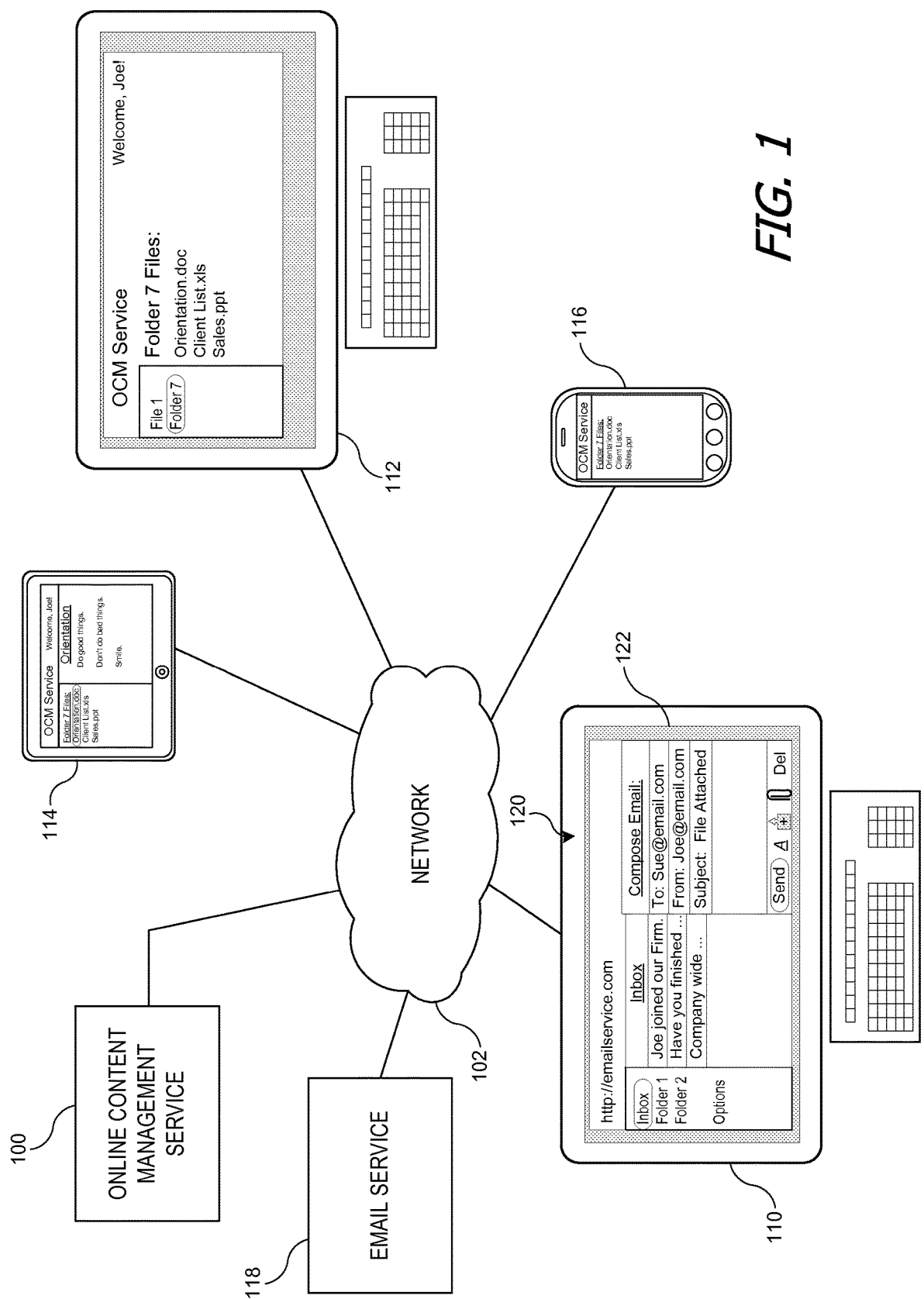
FIG. 1 shows clients accessing a shared content management service according to an embodiment of the present invention.

FIG. 1 shows clients accessing online content management service 100 according to an embodiment of the present invention. Online content management service 100 can include, for example, a file storage service, a file sharing service, a social media service that allows users to post messages and/or other content, and so on. Online content management service 100 can be hosted on servers maintained by a service provider and accessed via network 102, such as the Internet.

Users can access online content management service 100 directly by operating various clients 110, 112, 114, 116. As used herein, a "client" refers generally to a combination of computer hardware and software that enables a user to interact with online content management service 100. For example, client 110 can be a desktop or laptop computer executing a web browser (which can be, e.g., Internet Explorer® (a product of Microsoft Corp.), Google Chrome® (a product of Google Inc.), Safari® (a product of Apple Inc.), or similar software) that communicates with online content management service 100 using web protocols such as HTTP (Hypertext Transfer Protocol). Client 112 can be a desktop or laptop computer executing an application program provided by the provider of online content management service 100. In some instances where the online content management service provides access to files, the application program may allow files hosted on a server to appear to exist within a filesystem structure associated with the client computer's operating system. It should be noted that in some instances the same client computer can execute both a web browser and a desktop application program; accordingly, it is to be understood that a single physical device can implement one or more clients.

Other examples of clients include mobile devices, e.g., tablet computer 114 and mobile phone 116, which can execute application programs (also referred to as "apps") that communicate with online content management service 100. At various times, a user may be interacting with one or more of clients 110, 112, 114, 116.

In addition to accessing an online content management service 100, clients 110, 112, 114 and 116 can access email service 118. For example, client 110 can be a desktop or laptop computer executing a web browser (which can be, e.g., Internet Explorer® (a product of Microsoft Corp.), Google Chrome® (a product of Google Inc.), Safari® (a product of Apple Inc.), or similar software) that communicates with email service 118 using web protocols such as HTTP (Hypertext Transfer Protocol) or HTTPS (Hypertext Transfer Protocol Secure). Display 122 of client 110 shows web-based email service 120. A user can perform various email-related tasks, such as composing email, reviewing email, downloading attachments, uploading attachments, saving email and deleting email.

A client service, such as a browser plug-in, can be used to provide additional functionality to a client, such as client 110. The client service can, for example, add online content management service functionality as an addition to email functionality provided by email service 118. Client 110 can access email service 118. The client service can detect that email service 118 has been accessed and inject additional functionality into the display of email functionality. For example, the client service can determine that a web page was accessed from a domain used in conjunction with email service 118. The client service can then look for elements of the web page that can be augmented with additional functionality. For example, an email composition window can be augmented with a button that offers an online content management linking service next to an email attachment button. In another example, an email display page can be augmented with an attachment download link to online content management service 100.

For example, a browser plug-in running on client 110 can be used in the composition of email. The browser plug-in can detect an email composition page and provide a link to online content management service 100. The browser plug-in can provide a button that allows a user to browse online content management service 100 and select a content item. A download link to the selected content item can be provided in the email body rather than an attachment that takes up valuable email storage space.

In another example, the browser plug-in can direct an email attachment to be stored in online content management service 100. The browser plug-in can detect an email viewing page with an attachment element and provide a link to online content management service 100. The browser plug-in running on client 110 can detect a link to download an email attachment. The browser plug-in can then insert a second link that directs the attachment to be downloaded and stored to online content management service 100.

Figure 2:
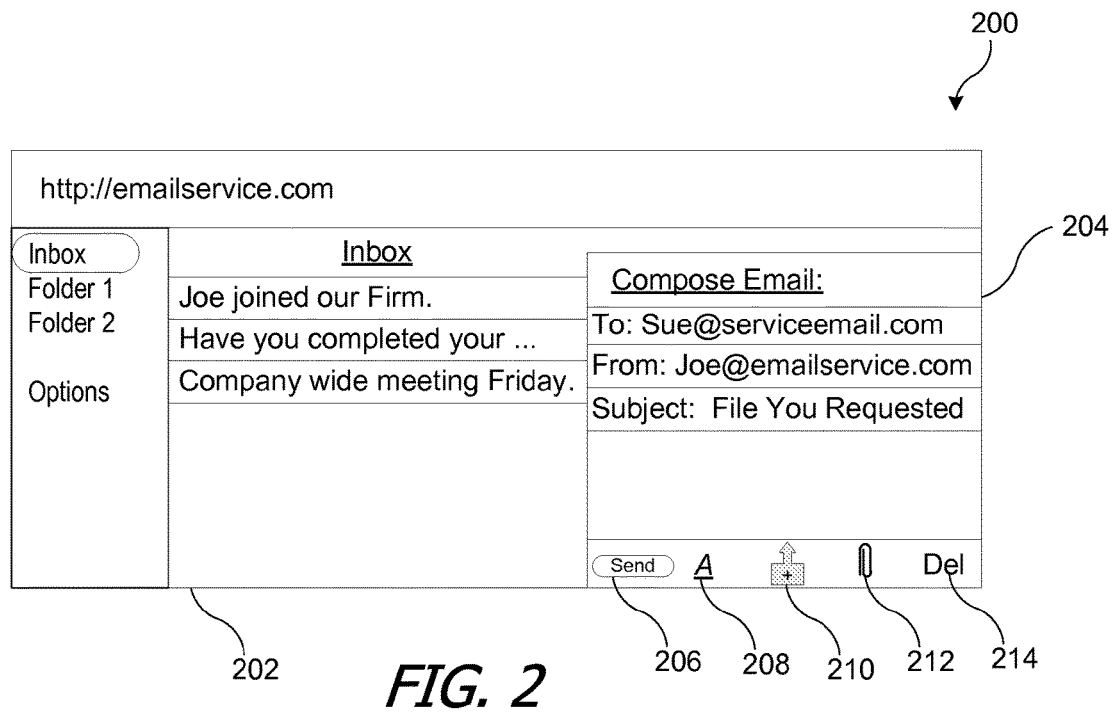
FIG. 2 shows an email composition window of an email service displayed in a browser according to an embodiment of the present invention.
Figure 3:
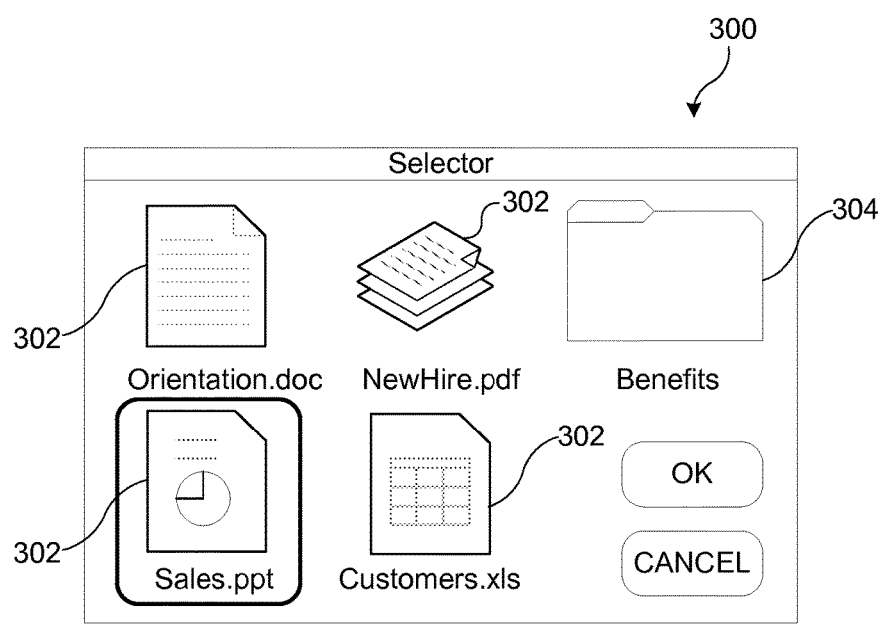
FIG. 3 shows a content item selection window according to an embodiment of the present invention.
Figure 4:
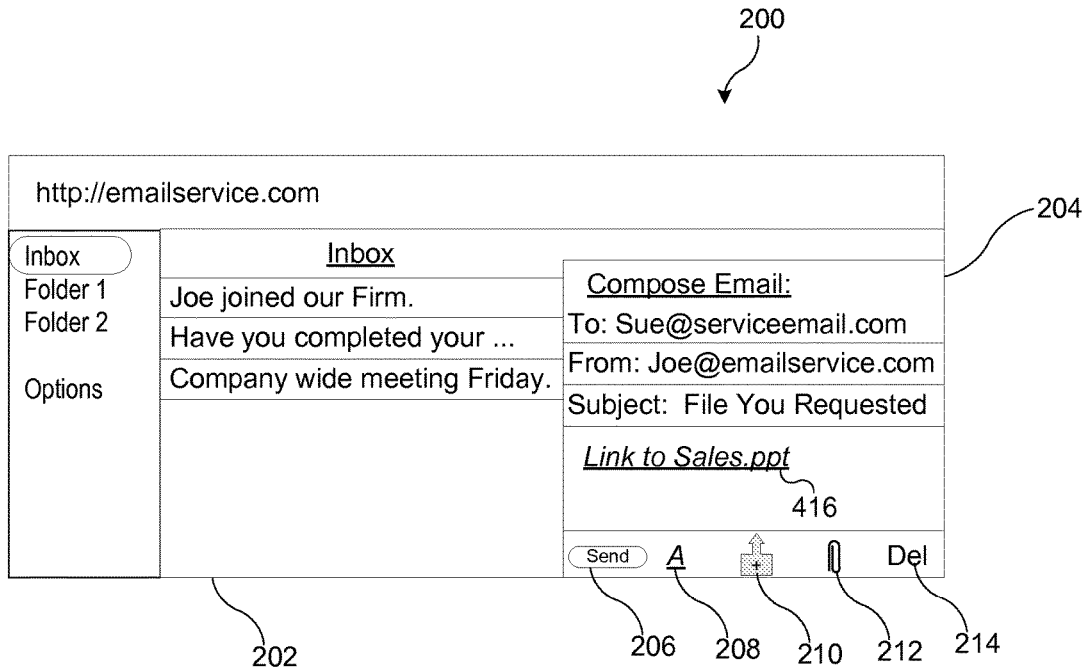
FIG. 4 shows an email composition window of an email service that includes a link to a content item according to an embodiment of the present invention.
Figure 5:
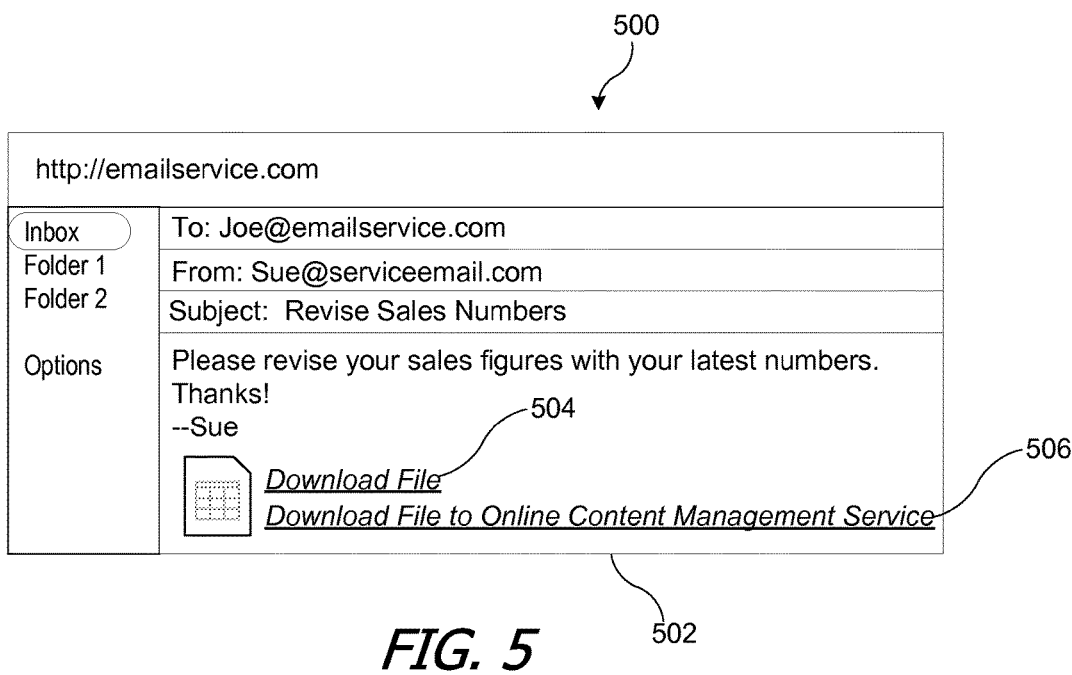
FIG. 5 shows an email preview window of an email service displayed in a browser.

Turning now to FIGS. 2 to 5, an augmented set of user interfaces to an email client is shown. FIGS. 2 to 4 show a progression of user interface views provided by a client service that can be used to provide a link to a content item in an online content management service. FIG. 5 shows an augmented email viewing interface that allows an email recipient to send an attachment directly to the online content management service.

A client service (e.g. a browser plug-in) can augment an email composition window to provide online content management services such as providing links to content items within the online content management service. FIG. 2 shows augmented user interface 200 to an email client. User interface 200 includes inbox display 202, email composition window 204 and a set of commands 206, 208, 210, 212 and 214. Stock commands (i.e. commands defined by the provider of the email service) include send button 206, text formatting button 208, attach file button 212 and delete draft 214 button. Content item button 210 can provide access to the online content management service. The client service can add content item button 210 to the stock commands 206, 208, 212 and 214, e.g. by modifying the page source code that the client browser uses to render the composition window, to extend functionality of the email client.

In one embodiment, an email author can provide a link in an email to a content item stored in an online content management account controlled by the email author. For example, content item button 210 can include functionality that, when activated, causes selection user interface 300, as shown in FIG. 3, to be opened.

An example of selection user interface 300 is shown in FIG. 3. Selection user interface 300 can show content items 302, 304 from an online content management service that are available to link in the email. The content items can include a hierarchy, such that an email author can browse through folders 304 to reach other content items. The email author can select one or more of the content items to reference in the email body. Selection user interface 300 can return the selection and cause the client service to request a link to the selected content item from the online content management service. In the embodiment shown, the email author can select, e.g., the "Sales.ppt" document.

As a result of the selection of a content item in the selection user interface, the online content management service can return a link to be inserted into a body of a draft email. FIG. 4 shows email composition window 204 with link 416 to the selected content item. As a result of selecting the "Sales.ppt" document, a link 416 to the document can be provided in the body of the email document. The link can provide a method to retrieve the document without attaching the document to the email, which can save space in an email quota. For example, the link can provide a URL identifying a location of the selected content item at the online content management service, and a recipient can access the item by following the link. The email author can continue composing the email that now includes link 416 to the "Sales.ppt" document. After completing the email, the email author can click on the send button 206 to send the email. After the email author sends the email, the email recipient can use the embedded link 416 to retrieve the document. In some embodiments, the content management service can return a link and a preview, such as a thumbnail picture of a part the linked document (e.g. the first page or a representative preview of the document).

A client service can also augment email viewing interface 500 that displays received emails. FIG. 5 shows augmented email viewing interface 500. The interface can include email viewing pane 502, attachment link 504 and augmented store attachment link 506. When an email recipient accesses an email that includes an attachment, a client service can detect the attachment and augment email viewing pane 502 with store attachment link 506. If an email recipient clicks on download file link 504, the email recipient can download the attachment to local storage. If an email recipient clicks on store attachment link 506, the attachment can be sent to the online content management service for storage.

While an example has been shown in which a link has been inserted into an email message, other references can also be used. For example, a reference may include an API call to the online content management service to request a download of the referenced content item.

The plug-in can include functionality to detect when augmentations to an email service can be performed. A plug-in to the browser can detect that a page from a compatible email service has been accessed, such as through matching a URL. The plug-in scans the page code until a document element is found that indicates that an augmentation can be inserted into the page. For example, inbox display 202 may not have an HTML, element indicating augmentation is available. However, when email composition window 204 is displayed, attachment button 212 can be detected and used as an indicator that content item button 210 can be inserted into the page that defines the window. A page can be defined by source code, (e.g. HTML) that instructs the browser on rendering document elements (e.g. text, formatting, control elements, etc.). The plug-in can insert code to render the content item button 210 into the page code. Content item button 210 can inherit styles from the page and be formatted to appear similar to other buttons and elements in window 204. Content item button 210 can include functionality that causes a selection user interface 300 (FIG. 3) to appear when content item button 210 is activated, such as clicking the content item button 210.

In some embodiments, the plug-in can require authentication to the online content management service before use. A user can authenticate a plug-in to the online content management service, such as by providing a username and password. The plug-in can receive credentials for use with the online content management service. These credentials can be used when the plug-in accesses the content management service, such as to select content items and/or store email attachments in the online content management service.

In other embodiments, a reference, such as a link, to a content item can be further enhanced with other options. For example, a link can be protected such that the content item can only be downloaded by a specified recipient or group of recipients. A link can be limited to a certain number of uses. The link can also be used to provide analytics and/or track which recipients have accessed the content item and which have not.

Figure 6:
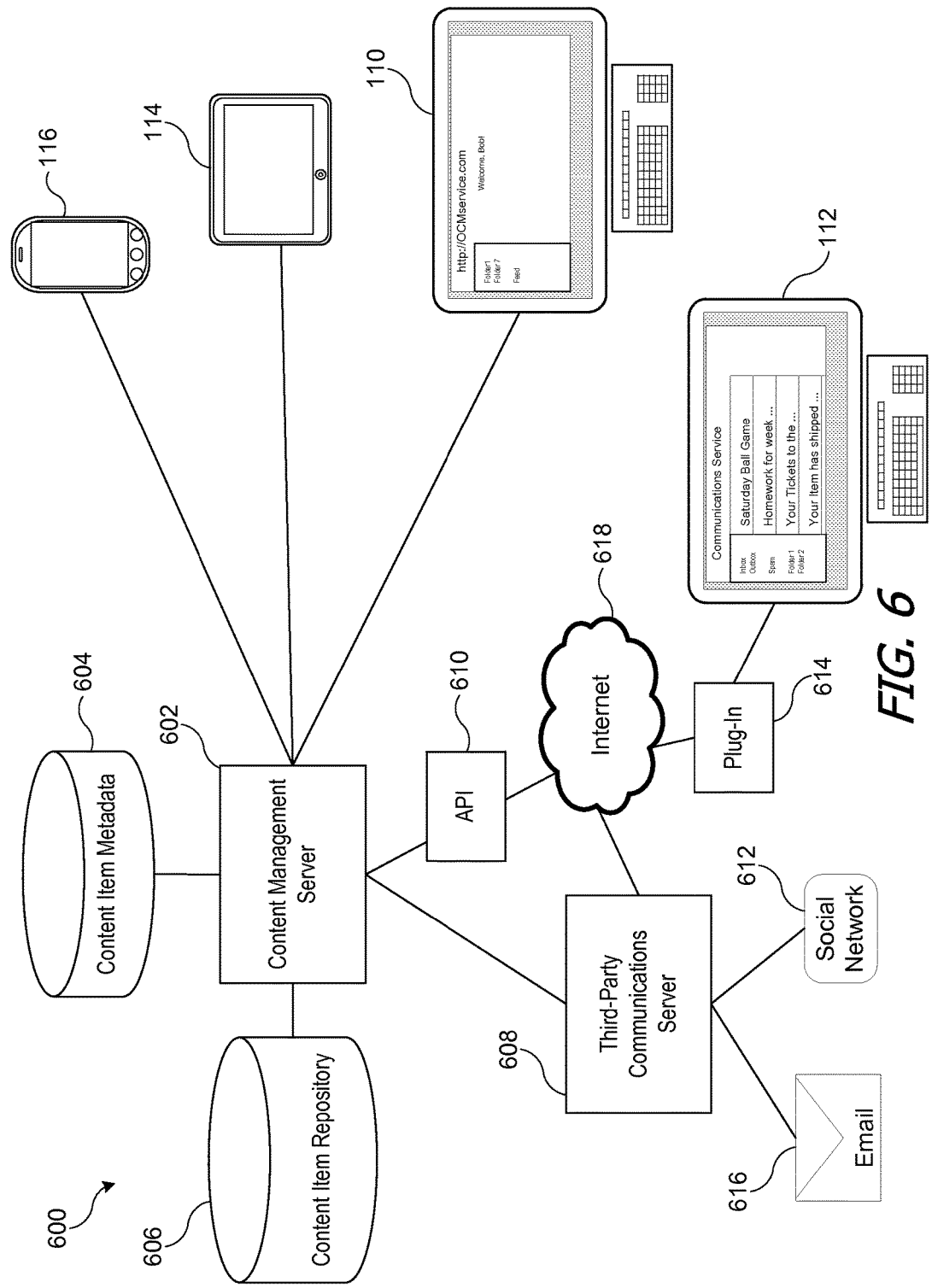
FIG. 6 shows a system for altering a document (e.g., a web page) from an email service to selectively provide references content items in an online content management service according to an embodiment of the present invention.

FIG. 6 shows a system for altering a document (e.g., a web page) from an email service to selectively provide references to content items in an online content management service according to an embodiment of the present invention. Online content management service 600 can include provider systems 602, 604, 606 and 610, clients 110, 112, 114, 116 and third party services 608, 612, 616. Provider systems 602, 604, 606 and 610 can include content management server 602, content item metadata storage 604, content item repository 606 and application programming interface (API) 610. Clients can include web client 110, application client 112, tablet computer 114 and mobile phone 116. Third party services can include third party communications server 608 that interfaces with other communication systems such as email service 616 and/or social network service 612. Client 110, 114 or 116 can contact content management server 602 to request a content item over a network (e.g. public network, private network, the Internet, etc.). The request from client 110, 114 or 116 can be based on a URL provided in an email as a hypertext link. Content management server 602 can request the content item from content item repository 606. Metadata from content item metadata storage 604 can be used to determine whether client 110, 114 or 116 has access to the requested content item. If allowed, content management server 602 can then return the requested content item to requesting client 110, 114 or 116.

Client 112 can use a local browser plug-in 614 to augment a communications service provided by third-party communications server 608. Plug-in 614 can be installed on client 112 and determine when a document (e.g., a web page) that can augmented with additional functionality is received from communications server 608 over a network such as the Internet 618. Plug-in 614 can determine that a document can be augmented based on domain, document name, document content, document elements or other information about the access or content of the document.

For example, an email composition page can be augmented. Communications server 608 can send an email composition page over the Internet 618 upon request from the client 112. Plug-in 614 can determine that compose email page contains an attachment request button. A content item button can be placed next to the attachment request button. The content item button can have associated executable instructions, such as in-line Javascript, external library files or associated plug-in functionality. When an email author activates the content item button, the plug-in or associated instructions can contact content management server 602 over the Internet 618 and through API 610 to request a listing of available content items that can be linked within the email document. The content management server can query content item repository 606 and/or content item metadata storage 604 to determine which content items can be listed in a return to plug-in 614. Through interaction with a content item selection user interface, such as seen in FIG. 3, an email author can interact with content management server 602 through API 610 until a content item is selected or the process is cancelled. If a content item is selected, plug-in 614 can request a reference to the content item, such as a link, through API 610. Content management server 602 can provide an activatable reference to plug-in 614. The email author can then complete the email and cause third-party communications server 608 to send the message, such as through email service 616 or through social media service 612.

An email recipient that encounters the message using client 110, 114 or 116 can use the activatable reference to access the content item. For example, an email can be received by client 110, 114 or 116 that contains an activatable reference, such as a hyperlink, from a process as described above. Client 110, 114 or 116 can use the activatable reference to contact content management server 602 to request the referenced content item. Content management server 602 can then retrieve the content item from the content item repository 606 and transmit the content item to client 110, 114 or 116. In some embodiments, content management server 602 can use the activatable reference to access metadata that identifies the content item in content item repository 606. The content item can then be returned to requesting client 110, 114 or 116.

The content item metadata can also provide extended features. For example, a link can be protected such that the content item can only be downloaded by a specified recipient or group of recipients. A link can be limited to a certain number of uses. The link can also be used to provide analytics and/or track which recipients have accessed the content item and which have not.

In another example, plug-in 614 can augment an email viewing page that includes an attachment. Plug-in 614 can determine that an email viewing page has been requested by client 112. Upon receipt of the email viewing page, plug-in 614 can scan for document elements that indicate an attachment is present, such as a download link. Plug-in 614 can insert a second link next to the download link that allows an email recipient to send the attachment to content management server 602. The resulting altered email viewing page can then be displayed by client 112. If an email recipient selects the second link, plug-in 614 or associated systems, such as a library, can send a request to content management server 602 using API 610 to download the attachment from third party communications server 608. Content management server 602 can directly request the attachment from communications server 608, if allowed. Content management server 602 can also receive the attachment through the intermediary of plug-in 614.

While an example of email service 616 has been given, it should be recognized that other communication services can be used. For example, a link can be inserted as part of a posting on a blog, short messaging service, social activity timeline, social media service or instant messaging service.

Figure 7:
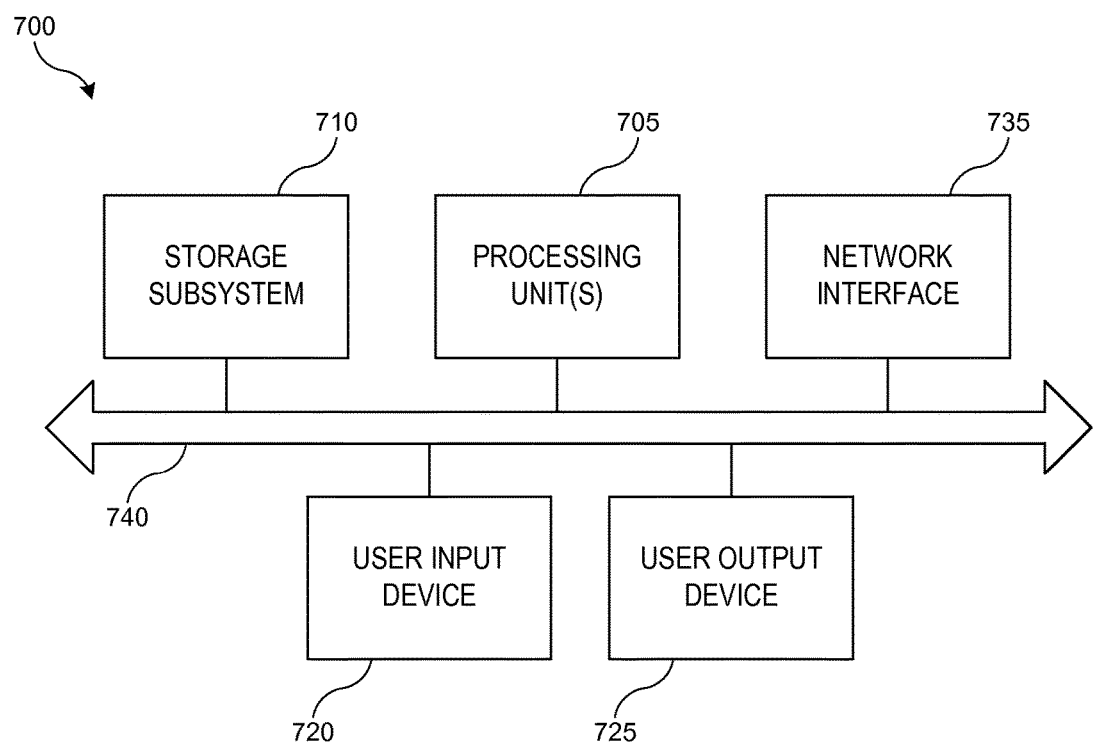
FIG. 7 shows a simplified block diagram illustrating a representative computer system.

Various operations described herein can be implemented on computer systems, which can be of generally conventional design. FIG. 7 is a simplified block diagram illustrating a representative computer system 700. In various embodiments, computer system 700 or similar systems can implement a client (e.g., any of platforms 110, 112, 114, 116) or a server (e.g., server 200).

Computer system 700 can include processing unit(s) 705, storage subsystem 710, input devices 720, output devices 725, network interface 735, and bus 740.

Processing unit(s) 705 can include a single processor, which can have one or more cores, or multiple processors. In some embodiments, processing unit(s) 705 can include a general-purpose primary processor as well as one or more special-purpose co-processors such as graphics processors, digital signal processors, or the like. In some embodiments, some or all processing units 705 can be implemented using customized circuits, such as application specific integrated circuits (ASICs) or field programmable gate arrays (FPGAs). In some embodiments, such integrated circuits execute instructions that are stored on the circuit itself. In other embodiments, processing unit(s) 705 can execute instructions stored in storage subsystem 710.

Storage subsystem 710 can include various memory units such as a system memory, a read-only memory (ROM), and a permanent storage device. The ROM can store static data and instructions that are needed by processing unit(s) 705 and other modules of electronic device 700. The permanent storage device can be a read-and-write memory device. This permanent storage device can be a non-volatile memory unit that stores instructions and data even when computer system 700 is powered down. Some embodiments of the invention can use a mass-storage device (such as a magnetic or optical disk or flash memory) as a permanent storage device. Other embodiments can use a removable storage device (e.g., a floppy disk, a flash drive) as a permanent storage device. The system memory can be a read-and-write memory device or a volatile read-and-write memory, such as dynamic random access memory. The system memory can store some or all of the instructions and data that processing unit(s) 705 need at runtime.

Storage subsystem 710 can include any combination of computer readable storage media including semiconductor memory chips of various types (DRAM, SRAM, SDRAM, flash memory, programmable read-only memory) and so on. Magnetic and/or optical disks can also be used. In some embodiments, storage subsystem 110 can include removable storage media that can be readable and/or writeable; examples of such media include compact disc (CD), read-only digital versatile disc (e.g., DVD-ROM, dual-layer DVD-ROM), read-only and recordable Blue-Ray® disks, ultra density optical disks, flash memory cards (e.g., SD cards, mini-SD cards, micro-SD cards, etc.), magnetic "floppy" disks, and so on. The computer readable storage media do not include carrier waves and transitory electronic signals passing wirelessly or over wired connections.

In some embodiments, storage subsystem 710 can store one or more software programs to be executed by processing unit(s) 705, such as an operating system, a browser application, a mobile app for accessing an online content management service, a desktop application for accessing the online content management service, and so on. "Software" refers generally to sequences of instructions that, when executed by processing unit(s) 705 cause computer system 700 to perform various operations, thus defining one or more specific machine implementations that execute and perform the operations of the software programs. The instructions can be stored as firmware residing in read-only memory and/or applications stored in non-volatile storage media that can be read into volatile working memory for execution by processing unit(s) 705. Software can be implemented as a single program or a collection of separate programs or program modules that interact as desired. From storage subsystem 710, processing unit(s) 705 can retrieve program instructions to execute and data to process in order to execute various operations described herein.

A user interface can be provided by one or more user input devices 720 and one or more user output devices 725. Input devices 720 can include any device via which a user can provide signals to computing system 700; computing system 700 can interpret the signals as indicative of particular user requests or information. In various embodiments, input devices 720 can include any or all of a keyboard, touch pad, touch screen, mouse or other pointing device, scroll wheel, click wheel, dial, button, switch, keypad, microphone, and so on.

User output devices 725 can include any device via which computer system 700 can provide information to a user. For example, user output devices 725 can include a display to display images generated by computing system 700. The display can incorporate various image generation technologies, e.g., a liquid crystal display (LCD), light-emitting diode (LED) including organic light-emitting diodes (OLED), projection system, cathode ray tube (CRT), or the like, together with supporting electronics (e.g., digital-to-analog or analog-to-digital converters, signal processors, or the like). Some embodiments can include a device such as a touchscreen that function as both input and output device. In some embodiments, other user output devices 725 can be provided in addition to or instead of a display. Examples include indicator lights, speakers, tactile "display" devices, printers, and so on.

Network interface 735 can provide voice and/or data communication capability for computer system 700. In some embodiments, network interface 735 can include radio frequency (RF) transceiver components for accessing wireless voice and/or data networks (e.g., using cellular telephone technology, advanced data network technology such as 3G, 4G or EDGE, WiFi (IEEE 802.11 family standards), or other mobile communication technologies, or any combination thereof), GPS receiver components, and/or other components. In some embodiments, network interface 735 can provide wired network connectivity (e.g., Ethernet) in addition to or instead of a wireless interface. Network interface 735 can be implemented using a combination of hardware (e.g., antennas, modulators/demodulators, encoders/decoders, and other analog and/or digital signal processing circuits) and software components.

Bus 740 can include various system, peripheral, and chipset buses that communicatively connect the numerous components of computing system 700. For example, bus 740 can communicatively couple processing unit(s) 705 with storage subsystem 710. Bus 740 can also connect to input devices 720 and output devices 725. Bus 740 can also couple computing system 700 to a network through network interface 735. In this manner, computing system 700 can be a part of a network of multiple computer systems (e.g., a local area network (LAN), a wide area network (WAN), an intranet, or a network of networks, such as the Internet.

Some embodiments include electronic components, such as microprocessors, storage and memory that store computer program instructions in a computer readable storage medium. Many of the features described in this specification can be implemented as processes that are specified as a set of program instructions encoded on a computer readable storage medium. When these program instructions are executed by one or more processing units, they cause the processing unit(s) to perform various operation indicated in the program instructions. Examples of program instructions or computer code include machine code, such as is produced by a compiler, and files including higher-level code that are executed by a computer, an electronic component, or a microprocessor using an interpreter.

Through suitable programming, processing unit(s) 705 can provide various functionality for computing device 700. For example, in a mobile computing device, processing unit(s) 705 can execute an operating system capable of receiving push notifications and an app to communicate with online content management service 100. In a desktop computing device, processing unit(s) 705 can execute an operating system and a desktop application program that presents an interface to online content management service 100; in some embodiments, this interface may be integrated with an interface to a filesystem maintained by the operating system. In some embodiments, processing unit(s) 705 can execute a browser application that provides the ability to retrieve and display content items from sources such as online content management service 100 (e.g., using HTTP or other data transfer protocols to retrieve and display web pages) and the ability to receive and interpret user input pertaining to the content items, such as selection of an item to view, submission of data by the user in response to a particular content item (e.g., filling out a form on an interactive web page), and so on.

In some embodiments, computer system 700 or a similar system can also implement content management server 602, content item metadata storage 604, content item repository 606, third party communications server 608, API 610, web client 110, application client 112, tablet computer 114 or mobile phone 116. In such instances, a user interface may be located remotely from processing unit(s) 705 and/or storage subsystem 710; similarly, storage subsystem 710 or portions thereof may be located remotely from processing unit(s) 705. Accordingly, in some instances, various components of computer system 700 need not be physically located in any particular proximity to each other.

It will be appreciated that computer system 700 is illustrative and that variations and modifications are possible. Computer system 700 can have other capabilities not specifically described here (e.g., mobile phone, global positioning system (GPS), power management, one or more cameras, various connection ports for connecting external devices or accessories, etc.). Further, while computer system 700 is described with reference to particular blocks, it is to be understood that these blocks are defined for convenience of description and are not intended to imply a particular physical arrangement of component parts. Further, the blocks need not correspond to physically distinct components. Blocks can be configured to perform various operations, e.g., by programming a processor or providing appropriate control circuitry, and various blocks might or might not be reconfigurable depending on how the initial configuration is obtained. Embodiments of the present invention can be realized in a variety of apparatus including electronic devices implemented using any combination of circuitry and software.

As described above, a client service can monitor incoming documents (e.g., web pages) and alter the documents to provide augmented services supported by the online content management service. An example of document 802 that can be augmented is shown in FIG. 8A and an example of document 802 after augmentation is shown in FIG. 8B, but is not exhaustive in scope. A client service, such as plug-in (e.g. plug-in 614 of FIG. 6), can determine that document 802 is retrieved from a compatible communications server (e.g. communications server 608 of FIG. 6). Plug-in 614 can review elements 804 and 806 of document 802 to determine if an element indicates that the document can be augmented. In document 802, element 806 is identified as having a class of attach. The plug-in 614 can identify the attach class identifier as an element 806 that references an attachment process.

FIG. 8B shows an example of an augmented HTML, document 808 after insertion of a online content management element (e.g., a button). After identifying the attach class identifier, element 806 can be augmented with an online content management button code 810 to request a link to a content item in an online content management service. The online content management button can be placed near a file attachment button and styled with one or more of the same styles applied to the file attachment button.

In another example of document alterations, an email-viewing web page can be altered to send an attachment to an online content management service. Upon receiving the page, a client service (e.g. plug-in 614) can determine the web-page is an email-viewing web page. The web-page can be analyzed for a download attachment link. An analysis of the download attachment link can be performed to extract information, such as a URL of a download link to the attachment. Next to the download attachment link in the web page, an activatable reference, such as a link, can be inserted that contacts the online content management service and requests the attachment be stored in the online content management service using the URL.

Elements that indicate potential augmentation can be manually or programmatically identified. An analysis of elements that can be augmented can be performed by an administrator or programmatically by the client. An administrator can analyze documents (e.g., web pages) from a communication service and determine documents that can be augmented. The administrator can then create identifiers and instructions that a client service, such as a plug-in, can follow to identify, analyze and insert elements that provide the augmentation. The resulting identifiers and instructions can then be sent out via update, made available as a download or provided as an accessible document. A client service can also include functionality that identifies potential augmentations, such as download links. For example, the client service can identify URL's and other identifiers that can be unique relative to the rest of the document.

The data structures of FIGS. 8A and 8B is illustrative, and variations and modifications are possible. A document can include any number of fields or elements and can have more or fewer fields than shown. Similarly, the number and content of fields of a document can be different from that shown. Further, while the example in FIGS. 8A and 8B references an HTML, page, other markup or rendering languages can also be used in connection with an appropriate plug-in.

Using data structures such as those of FIGS. 8A and 8B, system 600 of FIG. 6 can selectively provide links to content items stored in such services within an existing email client. Examples of processes that can be implemented at content management server 602, content item metadata storage 604, content item repository 606, third party communications server 608, API 610 and clients 110, 112, 114, 116 to provide content-item messaging server will now be described.

Figure 9:
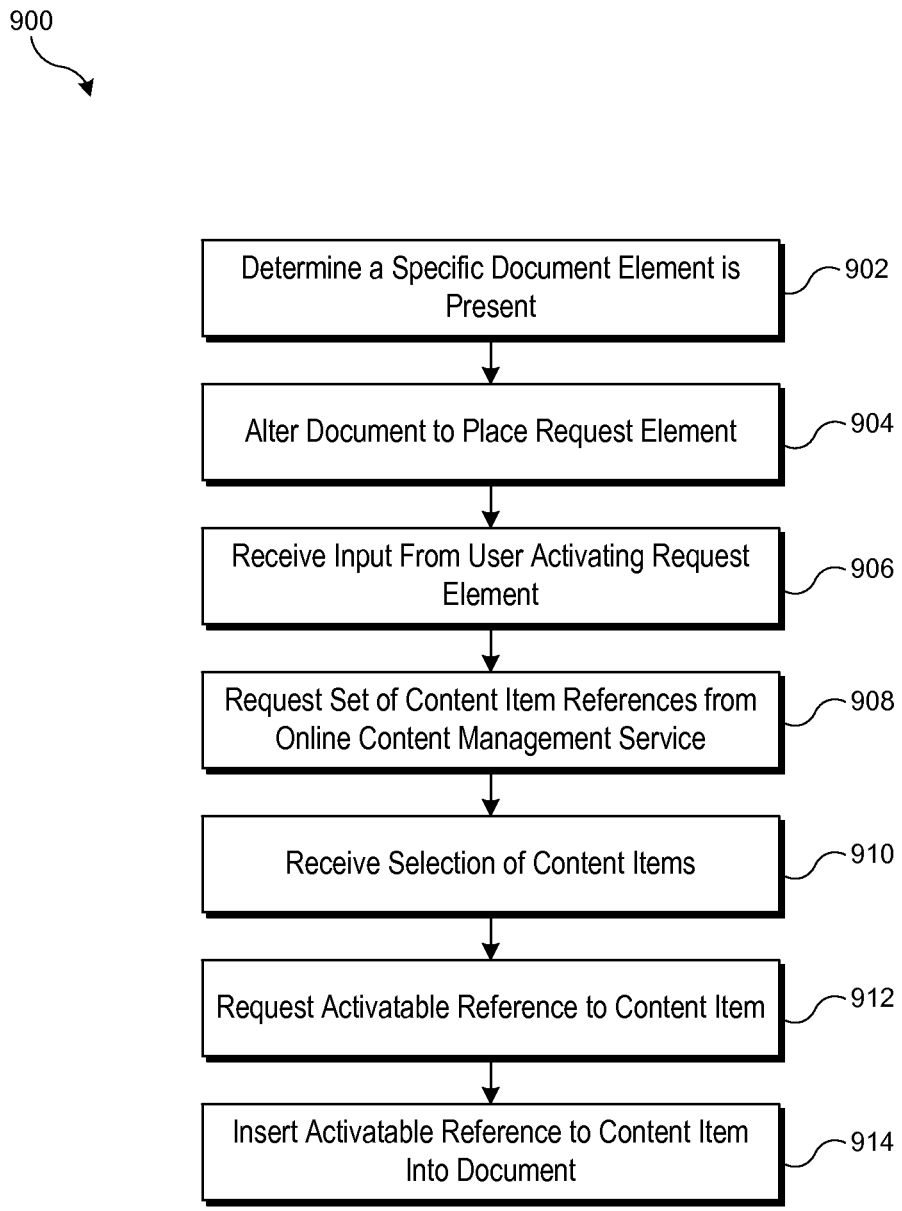
FIG. 9 shows a flow diagram of a process for selectively providing a reference in a document (e.g., a web page) to a content item in an online content management service according to an embodiment of the present invention.

FIG. 9 shows a flow diagram of a process 900 for selectively providing a reference (e.g. a link) in a document (e.g., a web page) to a content item (e.g. a file, folder, etc.) in an online content management service. Process 900 can be implemented on one or more clients, such as clients 110, 112, 114, 116. For example, a client performing this process can be operated by an email author composing an email. The email author can choose a content item from an online content management service to insert as an access link in the email instead of as an attachment.

At block 902, a document (e.g., a web page) has been received and the document is analyzed by a client service (e.g. a browser plug-in) to see if a specific document element is present. For example, a document from an email provider can be searched for a control element that represents a file attachment button. At block 904, the client can alter the document to insert a request element that ties to the online content management service. For example, an insert button operable to insert a link to a content item can be inserted into the document. The placement of the insert button can be based on the location of the file attachment button, such as next to the file attachment button, sharing a menu bar or other relative placement. At block 906, the plug-in or other supporting code can receive an input from the user activating the request element. For example, the plug-in can include an input method to be called when an email author clicks on the insert content item link. At block 908, the client can request a set of content items references from the online content management service. For example, the input method can include instructions that cause the client to request a set of content item names using an API of the online content management service to display to an email author. In some embodiments, the email author can request more content items by navigating a directory structure of the online content management service causing more API requests. The request can include credentials that identify an account or user of the online content management service. At block 910, the client can receive a selection from an email author of one or more content items. For example, the email author can select a document from a selection window (e.g. selection window 300 of FIG. 3) to add as a link in an email composition window. At block 912, the client can request an activatable reference (e.g. a hypertext link) to the selected content item. For example, the client can use the identifier of the selected content item in a request to a linking API of the online content management service. At block 914, the client can insert the activatable reference to the content item into document. For example, the client can insert a link returned from the linking API into an email composition window.

Figure 10:
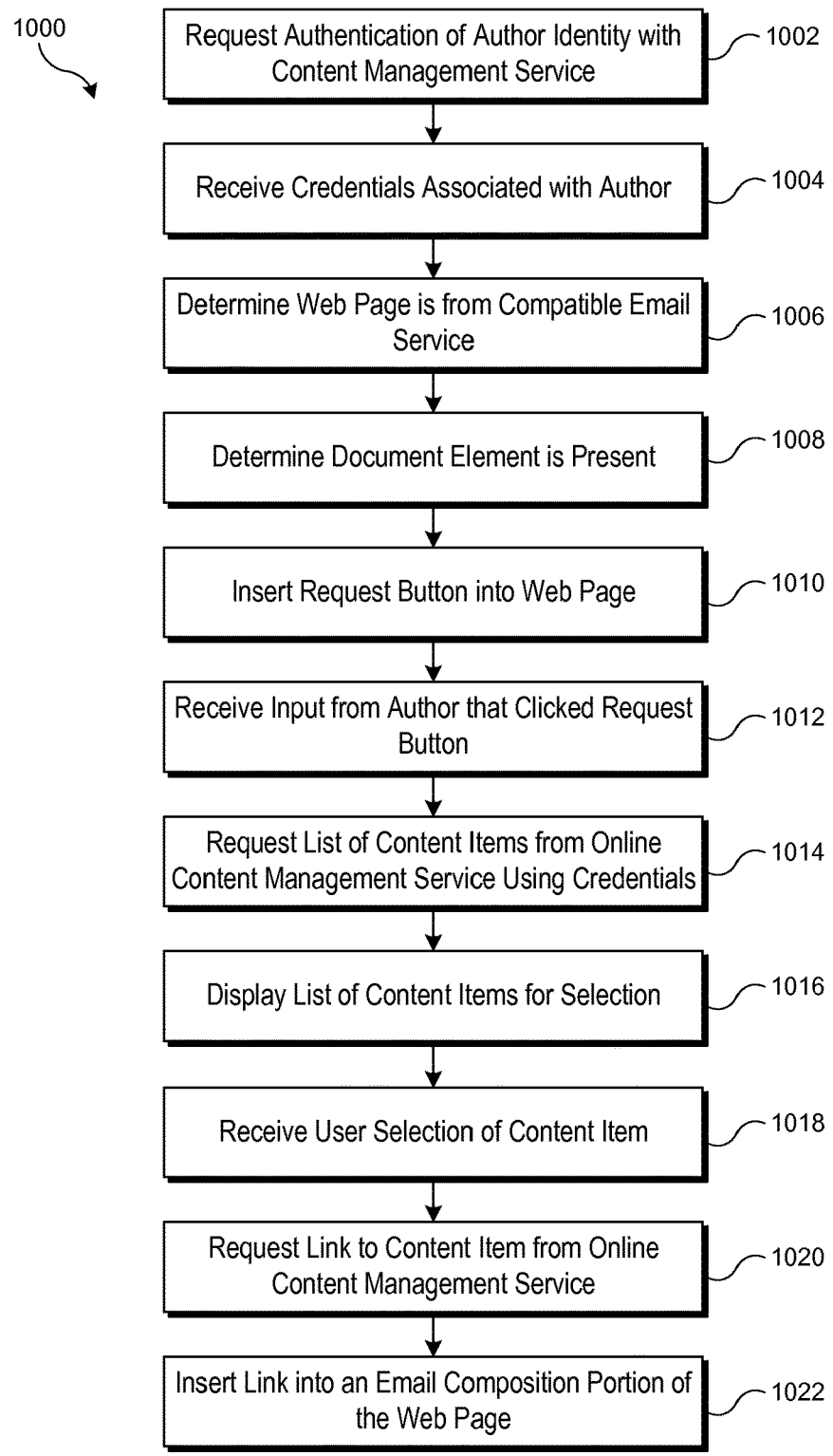
FIG. 10 shows a flow diagram of a process for selectively providing, in an email service, a reference to a content item stored by an online content management service according to an embodiment of the present invention.

An email author can also authenticate to a content management service to allow a content management service to selectively provide, in an email service, a reference to an email author's content item stored by an online content management service. FIG. 10 shows a flow diagram of a process 1000 for authenticating and selectively providing, in an email service, a reference to an email author's content item stored by an online content management service. Process 1000 can be implemented on one or more clients, such as clients 110, 112, 114, 116. For example, a client performing this process can authorize a plug-in to interact with the online content management service while composing an email. The client can access the online content management service using the plug-in to insert a button on an email composition page. The plug-in can allow the email author to insert a reference to a content item into a draft email.

At block 1002, a plug-in can request that the online content management service authenticate an email author's identity. At block 1004, the plug-in can receive credentials associated with the email author from the online content management service. At block 1006, the plug-in can determine if a web page is from a compatible email service. At block 1008, the plug-in can determine whether a document element is present such that additional services can be added. Block 1008 can be similar to Block 902 of FIG. 9. At block 1010, the plug-in can insert a request button into the web page that when activated causes a request to access the content management service. Block 1010 can be similar to Block 904 of FIG. 9. At block 1012, the plug-in can receive an input from an author that clicked the request button, activating the request element. Block 1012 can be similar to Block 906 of FIG. 9. At block 1014 and in response to the input, the client service can request a list of content items (e.g. a set of icons and content item names) from the online content management service using the credentials to prove the client service has authorization to act on behalf of the email author. Block 1014 can be similar to Block 908 of FIG. 9. In block 1016, the list of content items can be can be displayed to the email author for selection. In block 1018, the plug-in can receive an email author's selection of a content item. Blocks 1016 and 1018 can be similar to Block 910 of FIG. 9. In block 1020, the plug-in can request a link to the content item from the online content management service. Block 1020 can be similar to Block 912 of FIG. 9. In block 1022, the plug-in can insert the requested link into an email composition portion (e.g. a draft email) of the web page. Block 1020 can be similar to Block 914 of FIG. 9.

For example, an email author can enter a username and password into a dialog window of plug-in to authorize the plug-in to access an online content management service on behalf of the email author. In response to authenticating the email author, the online content management service can return a token that provides authentication and authorization to access content items in the online content management service. After an email author navigates the browser to a email service, the plug-in can determine that the URL of the email service indicates a compatible email service has been accessed. The plug-in can also determine that an email composition toolbar is present. As a result of detecting the toolbar, the plug-in can insert a linking button into the email composition toolbar such that the linking button appears as part of the availlable email composition tools. The toolbar can be altered to receive the linking button, such as by altering spacing between other toolbar buttons. The email author can click on the linking button to cause a client method of the plug-in to execute. The plug-in can perform an API call to the online content management service with the token to request a list of content items that are available to be linked in an email draft. A list of content items received from the API call can be displayed to a email author in a selection window (e.g. selection window 300 of FIG. 3). The email author can browse the list of available content items and select one of the content item references. Using the user selection, the client service can perform another API call using the token to request a link to a selected content item from the online content management service. The client service can insert the requested link into a draft email at a point designated by the email author's cursor.

When an email recipient receives the email, the email recipient can activate the link. In some embodiments, activating the link will cause the content item to download to the recipient's computer. In other embodiments, activating the link can cause a copy of the content item to be placed in the email recipient's storage in the online content management service. In another embodiment, activating the link can cause the email recipient to be granted access to the content item. In an embodiment, a preview of the item can be launched. Other functionality of a link or reference can be used such that the reference to a content item is included in a message rather than the content itself.

Figure 11:
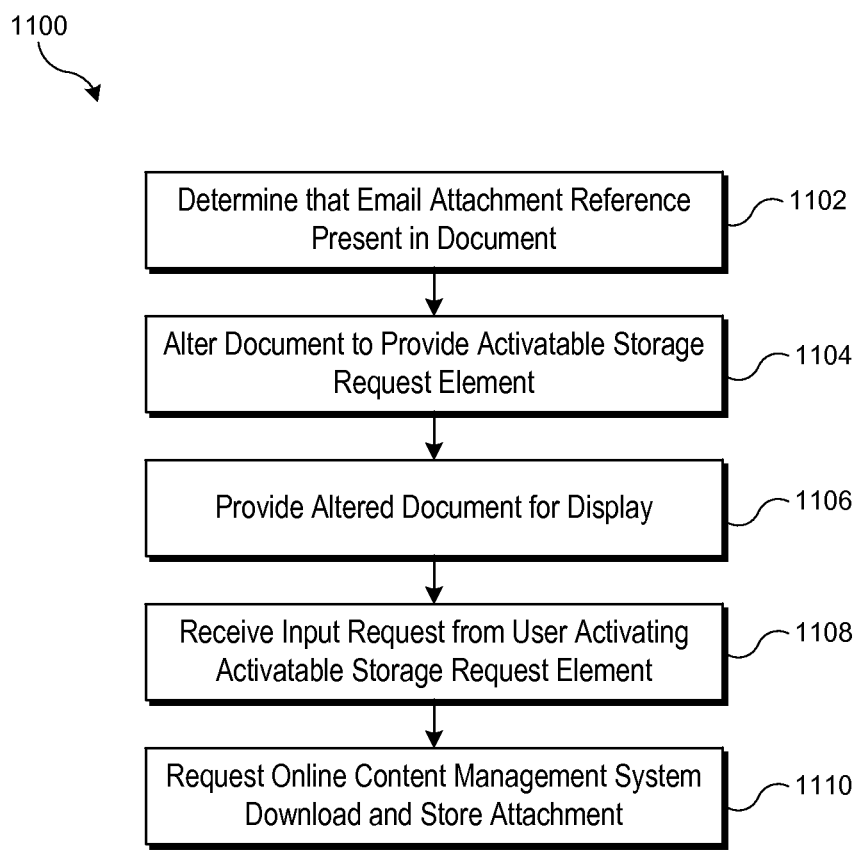
FIG. 11 shows a flow diagram of a process for altering a message display in an email service to provide a request to an online content management service to store an email attachment according to an embodiment of the present invention.

In some embodiments, a client service can detect email attachments in a document (e.g., a web page) displaying an email and alter the document to provide a link that can be used to send the attachment to an online content management service. FIG. 11 shows a flow diagram of a process 1100 for altering a message display for an email service to provide a link that can be used to request that an online content management service store an email attachment according to an embodiment of the present invention. Process 1100 can be implemented on one or more clients, such as clients 110, 112, 114, 116. For example, a client performing this process can have received a token from the online content management service to be used to augment the email service while displaying an email. The client can access the online content management service using the plug-in and token to insert a storage request link on an email display page. The plug-in can allow the recipient to send the content item to the online content management service.

At block 1102, a client service can determine that an email attachment reference is present in a document (e.g., a web page). For example, an email recipient can direct a browser to an email display page of an email service. A plug-in can detect that the email display page contains a link to an attachment. At block 1104, the client service can alter the document to provide an activatable storage request element. For example, the email display page can be altered to include a storage link that the user can select to send the attachment to the online content management service. At block 1106, the altered document can be displayed to an email recipient. For example, the altered email display page that now includes the storage link can be sent to the email recipient. At block 1108, the client service can receive an input from the User having activated the activatable storage request element. At block 1110, the client service can request the online content management service download and store the attachment reference in the storage request element. For example, For example, the email recipient can click on the storage link to cause an input method to execute and perform an API call requesting the online content management service to store the content. The request can include the reference, such as a URL, to the attachment and a client identifier.

While the invention has been described with respect to specific embodiments, one skilled in the art will recognize that numerous modifications are possible. For example, the particular events, data structures and platforms described herein are used for purposes of illustration; other events, data structures and platforms can be substituted. Techniques for altering a document from a compatible service to provide an activatable reference to an online content management service can also be modified as appropriate for a particular client. For example, while email clients have been discussed, it should be recognized that the techniques described herein can be used for other services including messaging applications such as social networks.

As noted above, it is not required that every requested document result in an alteration. Where a request does result in alteration of a document, the alteration can be presented in any manner desired, including using style instructions applied to other document elements. For example, a button can be added to a toolbar of a document such that it matches the style of other document elements.

Embodiments described above may make reference to data structures and databases, storage or data stores. It is to be understood that these terms can encompass any techniques for organizing information into discrete records that can be stored, retrieved and interpreted by computer systems.

Embodiments of the present invention can be realized using any combination of dedicated components and/or programmable processors and/or other programmable devices. The various processes described herein can be implemented on the same processor or different processors in any combination. Where components are described as being configured to perform certain operations, such configuration can be accomplished, e.g., by designing electronic circuits to perform the operation, by programming programmable electronic circuits (such as microprocessors) to perform the operation, or any combination thereof. Further, while the embodiments described above may make reference to specific hardware and software components, those skilled in the art will appreciate that different combinations of hardware and/or software components may also be used and that particular operations described as being implemented in hardware might also be implemented in software or vice versa.

Computer programs incorporating various features of the present invention may be encoded and stored on various computer readable storage media; suitable media include magnetic disk or tape, optical storage media such as compact disk (CD) or DVD (digital versatile disk), flash memory, and other non-transitory media. Computer readable media encoded with the program code may be packaged with a compatible electronic device, or the program code may be provided separately from electronic devices (e.g., via Internet download or as a separately packaged computer-readable storage medium).

Thus, although the invention has been described with respect to specific embodiments, it will be appreciated that the invention is intended to cover all modifications and equivalents within the scope of the following claims.

What is claimed:

1. A method comprising:
    accessing, by a browser, a document from a communication server of a messaging service, wherein the document includes a message composition section;
    detecting, by scanning the message composition section using a plug in, a document element in the document and a location corresponding to the document element, wherein the document element is an attachment control that provides file attachment functionality for attaching a file to a message composed in the message composition section;
    inserting, by the plug in, an online content management service request element into the document with a placement based at least in part on the location of the document element, wherein the online content management service request element is displayed simultaneously with the document element and provides access to an online content management service;
    requesting, by the plug in, a link to a content item stored at the online content management service;
    inserting, by the plug in, the link into the message composition section of the document; and
    causing to display, on a client, the document including the link in the message composition section.

2. The method of claim 1, wherein inserting the online content management service request element includes:
    modifying a source code of the document to insert the online content management service request element into the document, wherein the browser renders the document based on the source code.

3. The method of claim 1, further comprising:
    adapting a display format of the online content management service request element in the document based on a display format of the document element.

4. The method of claim 1, wherein the messaging service is an email service, and the message composition section of the document is an email composition section of the document.

5. The method of claim 1, comprising:
    sending, by the browser, to a content management server associated with the online content management service, a request to access the online content management service for an email author, wherein the content management server stores a plurality of content items for the online content management service; and receiving, from the content management server, access information associated with the email author, the access information enabling access to an account with the online content management service.

6. The method of claim 5 comprising:

in response to receiving an input indicating that the online content management service request element is activated, requesting, from the content management server, based on the access information, reference information identifying content items accessible to the account from the online content management service.

7. The method of claim 6, comprising:

displaying a set of references for selection, wherein the reference information includes the set of references, each reference of the set of references corresponding to a different one of the content items, and wherein the content item is selectable based on interaction with a reference of the set of references corresponding to the content item.

8. The method of claim 7, comprising:

selecting a content item from the content items identified by the reference information;

obtaining, from the content management server, a link indicating a location of the selected content item stored by the content management server; and inserting the link into the messaging composition section of the document.

9. The method of claim 1, wherein activation of the link adds the content item to a user account of the content management service.

10. A computer system comprising:

a data storage medium configured to store one or more documents retrieved from a service; and a processor coupled to the data storage medium and configured to:

access, by a browser executing on the processor, a document from a communication server of an email service, wherein the document includes an email composition section;

detect, by scanning the email composition section using a plug in, a document element in the document and a location corresponding to the document element, wherein the document element is an attachment control that provides file attachment functionality for attaching a file to an email message composed in the email composition section;

insert, by the plug in, an online content management service request element into the document with a placement based at least in part on the location of the document element, wherein the online content management service request element is displayed simultaneously with the document element and provides access to a content item stored at an online content management service;

request, by the plug in from the online content management service, a link to the content item;

insert, by the plug in, the link into the email composition section of the document; and cause to display, on a client, the document including the link in the email composition section.

11. The computer system of claim 10, wherein in response to receiving an input indicating that the online content management service request element is activated, the processor is configured to:

request, from a content management server, reference information identifying content items accessible to an account from the online content management service; and display the content items as selectable objects in a user interface.

12. The computer system of claim 11, wherein the processor is configured to:

receive a selection of at least one content item;

obtain, from the content management server, a link indicating a location of the selected content item stored by the content management server; and insert the link into the email composition section of the document.

13. The computer system of claim 12, wherein inserting the link into the email composition section of the document further comprises inserting a preview of the selected content item into the email composition section of the document.

14. The computer system of claim 10, wherein the processor is further configured to:

determine a URL that is used to access the document from the communication server; and determine, based on the URL, that the email service is a compatible email service.

15. A non-transitory computer-readable storage medium comprising instructions stored thereon that, when executed by one or more processors of a computer system, cause the computer system to:

access, by the computing system, a document from a communication server of an email service, wherein the document includes an email section;

detect, by scanning the email section included in the document accessed from the communication server of the email service using a plug in, an email attachment element in the document and a location corresponding to the email attachment element, wherein the email attachment element is associated with the email section and the email attachment element is an attachment control that provides file functionality; and alter the document to insert an activatable request element in the document based at least in part on the location of the email attachment element using the plug in, wherein the activatable request element displayed simultaneously with the email attachment element detected in the document and provides access to a content item stored at an online content management service;

request, by the plug in from the online content management service, a link to a content item stored at the online content service;

insert, by the plug in, the link into the email section of the document; and cause to display, by the computing system, the document including the link in the email section.

16. The non-transitory computer-readable storage medium of claim 15, wherein the instructions cause the computer system to:

render the altered document for display;

in response to receiving an input indicating activation of the activatable request element, request, from the communication server, reference information identifying content items accessible to an account from the online content management service;

select a content item from the content items identified by the reference information;

obtain, from the communication server, a link indicating a location of the selected content item stored by the communication server; and insert the link into the email section of the document.

17. The non-transitory computer-readable storage medium of claim 16, wherein detecting the location corresponding to the email attachment element further comprises periodically connecting to an update server of the online content management service to update detection instructions for the email attachment element.

18. The non-transitory computer-readable storage medium of claim 17, wherein the instructions cause the computer system to:

access the account with the online content management service; and wherein the email attachment is stored by the online content management service as a content item for the account, and wherein the content item is stored in association with the account.

\* \* \* \* \*